(12) United States Patent
Weaver, Jr.

(10) Patent No.: US 9,384,368 B2
(45) Date of Patent: Jul. 5, 2016

(54) INSTRUCTION AND LOGIC FOR MID-LEVEL CACHING OF RANDOM NUMBERS DISTRIBUTED TO MULTIPLE UNITS

(71) Applicant: Intel Corporation, Santa Clara, CA (US)

(72) Inventor: Edward G. Weaver, Jr., Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 713 days.

(21) Appl. No.: 13/729,715

(22) Filed: Dec. 28, 2012

(65) Prior Publication Data

US 2014/0188964 A1    Jul. 3, 2014

(51) Int. Cl.
*G06F 7/58* (2006.01)
*G06F 21/72* (2013.01)
*G06F 12/08* (2016.01)
*H04L 9/08* (2006.01)

(52) U.S. Cl.
CPC ............ *G06F 21/72* (2013.01); *G06F 12/0875* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 6,070,795 A * | 6/2000 | Feiken .......................... | 235/380 |
| 6,792,438 B1 * | 9/2004 | Wells et al. ................... | 708/250 |
| 7,269,614 B2 * | 9/2007 | Wells et al. ................... | 708/250 |
| 2002/0188808 A1 * | 12/2002 | Rowlands et al. ............ | 711/133 |
| 2004/0030734 A1 * | 2/2004 | Wells et al. ................... | 708/250 |
| 2014/0188964 A1 * | 7/2014 | Weaver, Jr. ................... | 708/250 |

* cited by examiner

*Primary Examiner* — David H Malzahn
(74) *Attorney, Agent, or Firm* — Kenyon & Kenyon LLP

(57) ABSTRACT

A system including a memory to store a plurality of digital random numbers generated by a digital random number generator, a plurality of cores coupled to the memory, the plurality of cores accessing the memory to retrieve digital random numbers.

27 Claims, 3 Drawing Sheets

INSTRUCTION AND LOGIC FOR MID-LEVEL CACHING OF RANDOM NUMBERS DISTRIBUTED TO MULTIPLE UNITS

FIELD OF THE INVENTION

The present disclosure pertains to secure execution in a processor, and more particularly, to instruction and logic for mid-level caching of random numbers distributed to multiple computing units.

DESCRIPTION OF RELATED ART

The tremendous increase in connectivity of computers has increased the importance of a robust security infrastructure. A computer system's security features can be used to prevent unauthorized access (e.g., from the Internet). For example, a secure execution environment that preserves the privacy and integrity of transactions is important to enable the use of Internet based commerce. In another example, a secured execution environment could also be used to provide copy protection for published software or content (e.g., music, e-books, movies, etc.).

Securing execution includes ensuring the integrity of the execution and ensuring the privacy of code and data. Various types of threats may lead to a compromise of the integrity or privacy of a system. For example, malicious software may be able to exploit weaknesses in the operating system. Direct memory access devices may be able to read physical memory without processor support. A logic analyzer may be used to observe the traffic between the processor and the memory. Attacks may also be made which take advantage of a processor's built-in debug mode or probe mode or which physically modify the connectivity of components in the system to observe and modify the communication between the components. An attacker could also subject the hardware to an abnormal voltage, temperature or frequency so as to compromise the execution of the system and possibly cause hardware to "leak" out secrets. In addition, an attacker could remove the process layers selectively to expose the device structures hiding the secrets or use an Ion beam to examine the flow of signals inside the device.

Some security schemes, such as those based on public/private key cryptography, use private data or codes that need to be kept secret. In several cases, the encoding algorithm used is publicly known, and the strength of the cryptography is in keeping the key secret. Security keys are often based on a random number. These random numbers may be generated by dedicated hardware or software units. However, distribution of random numbers in multi-core/multi-thread central processing units (CPUs) can cause performance bottlenecks because the source or sources generating random numbers are generally located remote from the cores and often in a lower frequency portion of the design resulting in significant access time delays. Accordingly, known systems do not provide an effective means for a distributing digital random numbers in multi-core/multi-thread CPUs.

DESCRIPTION OF THE FIGURES

Embodiments are illustrated by way of example and not limitation in the Figures of the accompanying drawings.

DETAILED DESCRIPTION

Figure 1:
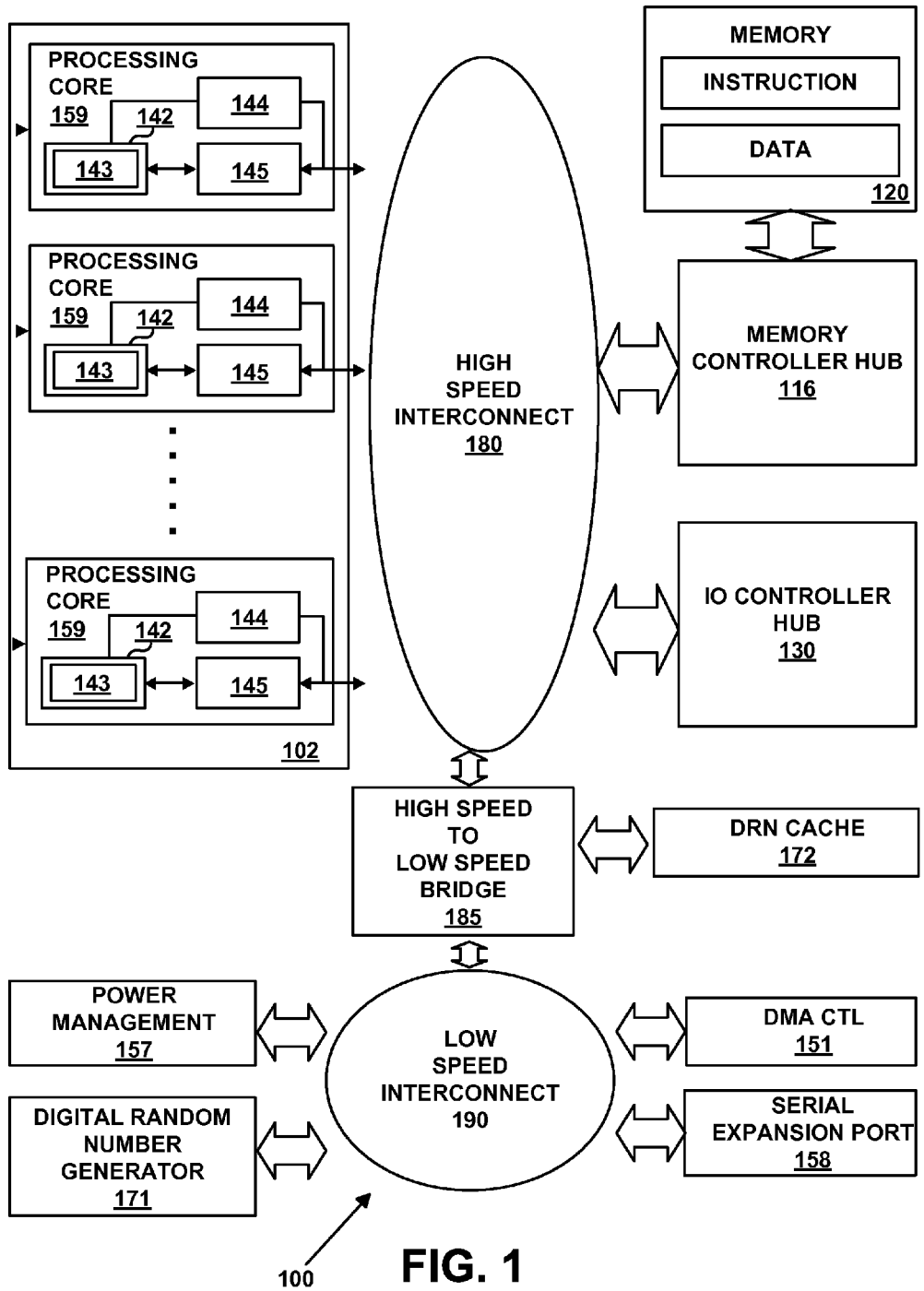
FIG. 1 is a block diagram of a system according to an example embodiment of the present invention.

The following description describes an instruction and processing logic for mid-level caching of random numbers distributed to multiple computing units within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the operations of embodiments of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, random number generation, etc. The need for fast access to random numbers has led to creation of special random number generation units to offload this effort from the processor. This random number generator can be a shared resource for a number of processors. This leads to the need efficiently distribute these generated random numbers to the processor or processors that will consume them.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1 is a block diagram of an exemplary computer system formed with a processor that includes execution units to execute an instruction in accordance with one embodiment of the present invention.

System 100 includes a processor 102 having one or more processing cores 159 to employ execution units including logic to perform algorithms for process data, in accordance with the present invention, such as in the embodiment described herein. For one embodiment, processor 102 represents a processing unit of any type of architecture, including but not limited to a CISC, a RISC or a VLIW type architecture. Processor 102 may also be suitable for manufacture in one or more process technologies and by being represented on a machine readable media in sufficient detail, may be suitable to facilitate said manufacture.

Each processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Each processing core 159 is coupled with a bus or high-speed interconnect 180 for communicating with various other system devices, which may include but are not limited to, for example, a system logic chip 116 and I/O controller hub (ICH) 130.

The system logic chip 116 in the illustrated embodiment is a memory controller hub (MCH). Each processing core 159 can communicate to the MCH 116 via the high-speed interconnect 180. The MCH 116 provides a high bandwidth memory path to memory 120 for instruction and data storage and for storage of graphics commands, data and textures. The MCH 116 is to direct data signals between the processing cores 159, memory 120, and other components in the system 100 and to bridge the data signals between high-speed interconnect 180 and memory 120.

The ICH 130 provides direct connections to some I/O devices via a local I/O bus. The local I/O bus is a high-speed I/O bus for connecting peripherals to the memory 120, chipset, and processing cores 159. Some examples are PCIe, the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

System 100 uses a bridge 185 to couple the high-speed high-bandwidth interconnect 180 and low-speed interconnect 190. In this system implementation the random number cache is connected to this bridge in a location between random number consumers like processing cores 159 and the random number generator 171. In other implementations this cache could be directly connected to the high speed interconnect or to the low speed interconnect.

In this implementation, connected to the low-speed interconnect are a digital random number (DRN) generator 171, serial expansion port 158, direct memory access (DMA) controller 151, and power management module 157. In other implementations, some of these items may be connected to the high speed interconnect.

Embodiments of the present invention involve an instruction for mid-level caching of random numbers distributed to multiple computing units. Digital random number generator 171 may be a hardware random number generator that uses any randomization function. For example, digital random number generator unit 171 can utilize statistical phenomenon in physical devices (thermal noise, for example) to provide random numbers. Random numbers generated by digital random number generator 171 may be stored in DRN cache 172, that is coupled to bridge 185. This DRN cache could be located at different locations in the system. A first-level DRN cache may be located inside the processor unit for very fast local access but this has a higher impact on the processor design and is not easily shareable with other units. Similarly, the DRN cache could be located within the DRN generator, a last-level cache. The generator is likely to be remote from the units requesting random numbers and may be located in a lower speed portion of the design. A mid-level random number cache sits between these two extremes. By storing a cache of random numbers at a location in between the producers and consumers, with access the high speed interconnect to which the consumers are attached, this mid-level cache optimizes the use of the shared resource of the stored random numbers. In this manner, mid-level DRN cache 172 is coupled to one or more processing cores 159 via high speed interconnect 180.

System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment may be described in the context of a single processor desktop or server system, but alternative embodiments can be included in a multiprocessor system. System 100 is an example of a multiprocessor system architecture. The computer system 100 includes a processor 102 having one or more processing cores 159 to process data signals. Each processing core 159 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. Each processing cores 159 is coupled to a high speed interconnect 180 that can transmit data signals between processing cores 159 and other components in the system 100. The elements of system 100 perform their conventional functions that are well known to those familiar with the art.

In one embodiment, the processor 102 includes a Level 1 (L1) internal cache memory. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. A register file can store different types of data in various registers including integer registers, floating point registers, status registers, and instruction pointer register.

System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processing cores 159.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
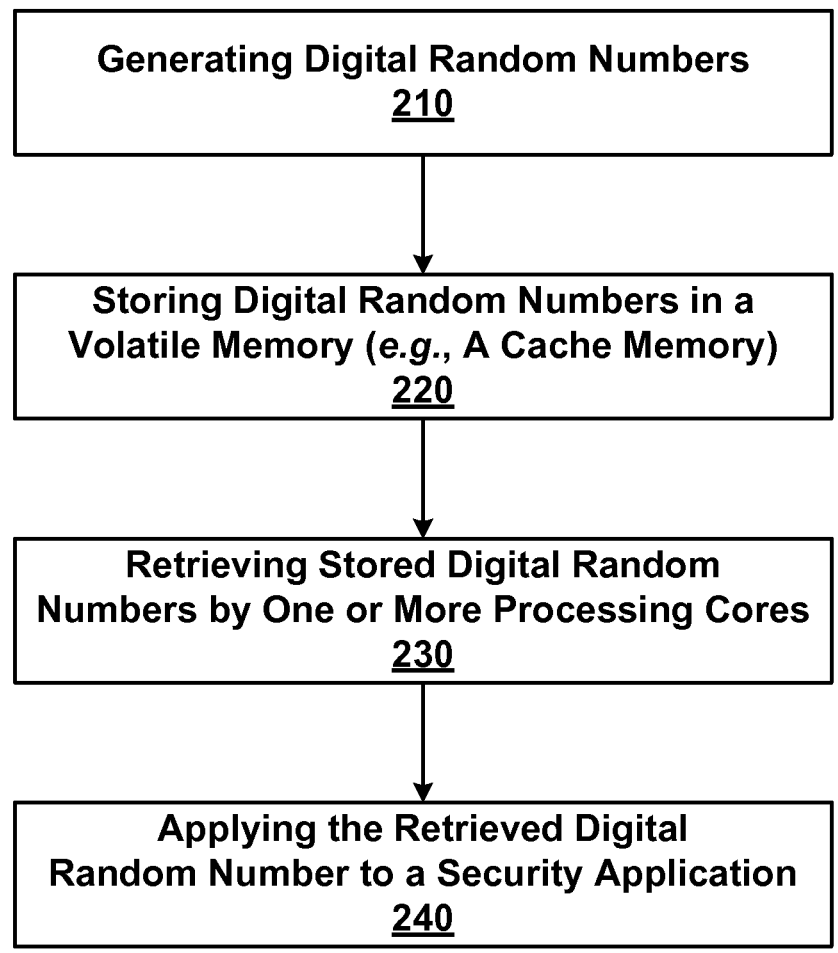
FIG. 2 illustrates a method for distributing digital random numbers to a plurality of cores according to an example embodiment of the present invention.

FIG. 2 illustrates a method for distributing digital random numbers to a plurality of cores according to an example embodiment of the present invention.

At 210, a digital random number is generated by a digital random number generator. As discussed above, various randomization techniques may be used to generate the digital random number.

Next, at 220, the generated digital random number is stored in a volatile memory, such as a cache. As the digital random number generator and volatile memory are interconnected through a bus, random numbers can quickly be transferred from the digital random number generator to the volatile memory. This memory may consist of on-chip flip-flops, registers, an SRAM memory array, etc.

At 230, one or more processing cores retrieve random digital random numbers stored in the volatile memory. As a plurality of processing cores are also coupled to the bus, random numbers can also be quickly transferred from the volatile memory to the requesting processing core. Lastly, at 240, the digital random number may be applied to a security applications such as encryption keys and obscuring data that might otherwise be detected. The random numbers may also be applied to scientific research such as Monte-Carlo simulations.

Figure 3:
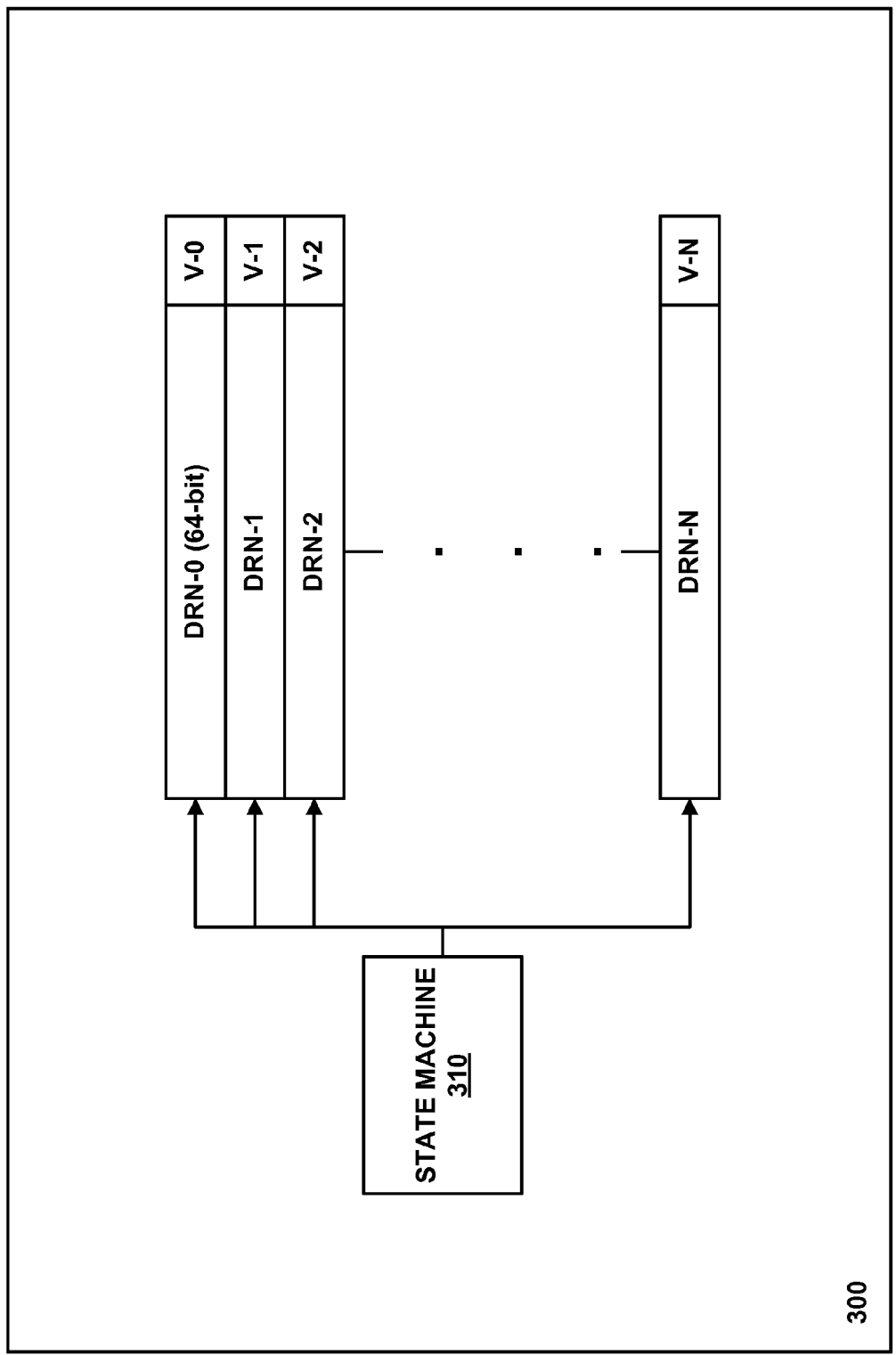
FIG. 3 illustrates a cache structure for storing digital random numbers according to an example embodiment of the present invention.

FIG. 3 illustrates a cache structure for storing digital random numbers according to an example embodiment of the present invention.

As shown in FIG. 3, cache 300 includes N entries of digital random numbers DRN-0 to DRN-N where the number N can be varied according to the number of threads. Digital random numbers stored in cache 300 are generated by a digital random number generator coupled to the cache through an interconnect (as depicted in FIG. 1). Digital random numbers can be 64-bit, 128-bit, or other sizes, as preferred. Each cache entry can also include validity bits V-0 to V-N. In this embodiment, the random numbers are fetched under control of state machine 310, which is coupled to the random number generator as discussed above.

When one of the digital random numbers DRN-0 to DRN-N is retrieved by one of the cores, the validity bit V-0 to V-N corresponding to that digital random number is changed to a value indicating invalidity. State machine 310 manages the refilling of invalid entries, such as already used random numbers, from the digital random number generator. The state machine may also clear the memory associated with the random number once it has been consumed. Validity bits V-0 to V-N track validity can be sent with the random data so consumers know if they receive good values. Alternatively, the validity bits can be used to send a predetermined data pattern indicating an invalid response. For example, all zeros can be returned to indicate invalid data if there is no separate bit in the register response to indicate bad data. Since all zeros is a valid random number, additional validity bits could be added if desired to log whether the last request of each consumer was satisfied with valid random data if necessary to differentiate this special case.

The proposed digital random number generator and corresponding cache has several advantages. First, latency from supplying digital random numbers to cores is significantly reduced, typically by a factor of two. Latency is reduced in half compared to current systems because the cache that stores valid entries is coupled to a higher bandwidth interconnect that is located physically closer to the core units. Second, the peak bandwidth for providing digital random numbers to core units is also typically increased by a factor two (~2× current bandwidth) since it is located with access to the high speed interconnect. Third, the cache can be prefilled during times of low request rates to better handle bursts of requests at startup or random periods of congestion. State machine 310 may retrieve random numbers from the random number generator as numbers are taken by the core units. Alternatively, the state machine may retrieve random numbers when the number of random numbers in the cached has fallen below a particular threshold. Fourth, the proposed solution can be scaled with increasing cores without redesign of the digital random number generator. Fifth, the digital random number generator can remain in lower frequency domains and less congested regions of a chip.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A non-transitory computer-readable memory for caching digital random numbers, the non-transitory computer-readable memory comprising:
a state-machine;
a plurality of cache entries operable to store digital random numbers generated by a digital random number generator, wherein the digital random numbers are supplied to the cache entries under control of the state-machine; and
a plurality of validity entries corresponding to each of the plurality of cache entries to track whether an entry contains a valid random number.

2. The non-transitory computer-readable memory according to claim 1, wherein the non-transitory computer-readable memory, the digital random number generator, and a plurality of computer processor cores are interconnected by a bus or high speed interconnect.

3. The non-transitory computer-readable memory according to claim 2, wherein the memory is configured to output the digital random numbers to the processor cores via the bus or high speed interconnect in response to retrieval requests from the processor cores, and to invalidate the validity entries in response to the processor cores retrieving the digital random numbers.

4. The non-transitory computer-readable memory according to claim 2, wherein one of the plurality of computer processor cores uses a digital random number retrieved from the memory to enable a security feature.

5. The non-transitory computer-readable memory according to claim 1, wherein the digital random number generator generates random numbers based on a statistical phenomenon of a physical device.

6. A processor comprising:
a bus or high speed interconnect;
a memory coupled to the bus or high speed interconnect to store a plurality of digital random numbers generated by a digital random number generator;
a plurality of computer processor cores coupled to the memory via the bus or high speed interconnect, the plurality of computer processor cores accessing the memory to retrieve the digital random numbers,
wherein the memory includes:
a state-machine, the digital random numbers being supplied via the state-machine; and
a plurality of validity entries corresponding to each of the plurality of digital random numbers to track whether each entry contains a valid random number.

7. The processor according to claim 6, wherein the memory, the digital random number generator, and the plurality of computer processor cores are interconnected by the bus or high speed interconnect.

8. The processor according to claim 6, wherein one of the plurality of computer processor cores uses a digital random number retrieved from the memory to enable a security feature.

9. The processor according to claim 6, wherein the digital random number generator generates random numbers based on a statistical phenomenon of a physical device.

10. The processor according to claim 6, wherein the memory is configured to output the digital random numbers to the processor cores via the bus or high speed interconnect in response to retrieval requests from the processor cores, and to invalidate the validity entries in response to the processor cores retrieving the digital random numbers.

11. A non-transitory machine-readable medium having stored thereon instructions, which when executed by a machine causes the machine to perform a method comprising:
storing, at a memory, a plurality of digital random numbers generated by a digital random number generator; and
retrieving, by a plurality of computer processor cores coupled to the memory, the digital random numbers,
wherein the memory includes:
a state-machine, the digital random numbers being supplied via the state-machine; and
a plurality of validity entries corresponding to each of the plurality of digital random numbers to track whether each entry contains a valid random number.

12. The machine-readable medium according to claim 11, wherein the memory, the digital random number generator, and the plurality of computer processor cores are interconnected by a bus.

13. The machine-readable medium according to claim 11, wherein one of the plurality of computer processor cores uses a digital random number retrieved from the memory to enable a security feature.

14. The machine-readable medium according to claim 11, wherein the digital random number generator generates random numbers based on a statistical phenomenon of a physical device.

15. A computer-implemented method comprising:
storing, at a computer-readable memory, a plurality of digital random numbers generated by a digital random number generator; and
retrieving, by a plurality of computer processor cores coupled to the memory, the digital random numbers,
wherein the memory includes:
a state-machine, the digital random numbers being supplied via the state-machine; and
a plurality of validity entries corresponding to each of the plurality of digital random numbers to track whether each entry contains a valid random number.

16. The method according to claim 15, wherein the memory, the digital random number generator, and the plurality of computer processor cores are interconnected by a bus or high speed interconnect.

17. The method according to claim 15, wherein one of the plurality of computer processor cores uses a digital random number retrieved from the memory to enable a security feature.

18. The method according to claim 15, wherein the digital random number generator generates random numbers based on a statistical phenomenon of a physical device.

19. The method according to claim 15, wherein the memory is configured to invalidate the validity entries in response to the retrieving.

20. A system comprising:
a bus or high speed interconnect;
a memory coupled to the bus or high speed interconnect to store a plurality of digital random numbers generated by a digital random number generator;
a plurality of computer processor cores coupled to the bus or high speed interconnect and the memory, the plurality of computer processor cores accessing the memory to retrieve the digital random numbers,
wherein the memory includes:
a state-machine, the digital random numbers being supplied via the state-machine; and
a plurality of validity entries corresponding to each of the plurality of digital random numbers to track whether each entry contains a valid random number.

21. The system according to claim 20, wherein the memory, the digital random number generator, and the plurality of computer processor cores are interconnected by the bus or high speed interconnect.

22. The system according to claim 20, wherein one of the plurality of computer processor cores uses a digital random number retrieved from the memory to enable a security feature.

23. The system according to claim 20, wherein the digital random number generator generates random numbers based on a statistical phenomenon of a physical device.

24. A non-transitory machine-readable medium having stored thereon instructions, which when executed by at least one machine, cause the at least one machine to fabricate at least one integrated circuit configured to perform a method comprising:
storing, at a memory, a plurality of digital random numbers generated by a digital random number generator; and
retrieving, by a plurality of computer processor cores coupled to the memory, the digital random numbers,
wherein the memory includes:
a state-machine, the digital random numbers being supplied via the state-machine; and
a plurality of validity entries corresponding to each of the plurality of digital random numbers to track whether each entry contains a valid random number.

25. The machine-readable medium according to claim 24, wherein the memory, the digital random number generator, and the plurality of computer processor cores are interconnected by a bus.

26. The machine-readable medium according to claim 24, wherein one of the plurality of computer processor cores uses a digital random number retrieved from the memory to enable a security feature.

27. The machine-readable medium according to claim 24, wherein the digital random number generator generates random numbers based on a statistical phenomenon of a physical device.

* * * * *